United States Patent [19]

Williams

[11] Patent Number: 5,271,526

[45] Date of Patent: Dec. 21, 1993

[54] PROGRAMMABLE ADDITIVE CONTROLLER

[75] Inventor: Gary E. Williams, Atlanta, Ga.

[73] Assignee: Titan Industries, Inc., Atlanta, Ga.

[21] Appl. No.: 884,937

[22] Filed: May 18, 1992

Related U.S. Application Data

[63] Continuation-in-part of Ser. No. 629,651, Dec. 7, 1990, Pat. No. 5,118,008.

[51] Int. Cl.$^5$ .............................................. B67D 5/30
[52] U.S. Cl. ...................................... 222/16; 222/57; 222/71; 222/642; 137/624.13; 377/16
[58] Field of Search ....................... 222/14, 16, 71, 57, 222/639, 1, 54, 642; 377/16, 20; 137/487.5, 624.15, 624.13

[56] References Cited

U.S. PATENT DOCUMENTS

| | | |
|---|---|---|
| 4,105,138 | 8/1978 | Lehmann et al. |
| 4,518,101 | 5/1985 | Robinson |
| 4,601,409 | 7/1986 | DiRegolo |
| 4,676,403 | 6/1987 | Goudy, Jr. et al. |
| 4,679,585 | 7/1987 | Ewing |
| 4,690,163 | 9/1987 | Steinemann |
| 4,706,703 | 11/1987 | Takeuchi et al. |
| 4,719,574 | 1/1988 | Duback et al. |
| 4,794,947 | 1/1989 | Kuramochi |
| 4,840,292 | 6/1989 | Harvey |
| 4,877,051 | 10/1989 | Day |
| 4,961,441 | 10/1990 | Salter |
| 5,118,008 | 6/1992 | Williams .............................. 222/1 |

FOREIGN PATENT DOCUMENTS 1295896  5/1969  Fed. Rep. of Germany.
55-115111  9/1980  Japan.

Primary Examiner—Gregory L. Huson
Attorney, Agent, or Firm—James Creighton Wray

[57] ABSTRACT

Programmable additive controllers control flow of fluid additives from a fluid supply line. A flowmeter is connected to the solenoid control valve for measuring flow of fluid. A controller opens and closes the control valve. The control valve is positioned downstream from the flowmeter, leaving the meter full upon shut off. A settable input controls cyclic operation of the controller. The controller further incorporates an input for required quantities of additive to be added on each cycle. A comparator in the controller compares a required quantity with signal output indicating flow through the flowmeter. The difference, if any, between actual flow and target flow is continuously sent, and the target flow is continuously adjusted up or down when necessary to compensate for the previous difference. The comparator connects to a closing control for closing the control valve and preventing further flow of additive when the cumulative flowmeter output signal approaches the requirement. Condition specific alarms signal the user and controller during operation if over or under injections are detected. Over injections relayed by the alarm to the controller cause a closing of the valve. A secondary alarm is provided for signalling if the apparatus continuously injects for over a given time period. A three-way valve connects to the flowmeter for selectively flowing fluid additive to a test and to an outlet for ejection into a mixing tank. The controller has an input for local panel factor and reads out mixing ratio volume per cycle and total volume of additive.

21 Claims, 5 Drawing Sheets

DC PULSE INPUT
FROM PULSE TRANSMITTER:
AS LOAD METER TRANSMITTER,
LOAD COMPUTER, OR
PROGRAMMABLE LOGIC
CONTROLLER (PLC)

120 VAC POWER
BLACK (POWER)
WHITE (NEUTRAL)
RED (ALARM LIGHT)
WHITE (NEUTRAL)
PURPLE (ADDITIVE PULSE)
ORANGE (ADDITIVE PULSE NEUTRAL)

RS-422 SERIAL COMMUNICATIONS
BLACK (TRANSMIT +)
ORANGE (TRANSMIT -)
BLUE (RECEIVE +)
PURPLE (RECEIVE -)
GREEN (GROUND)

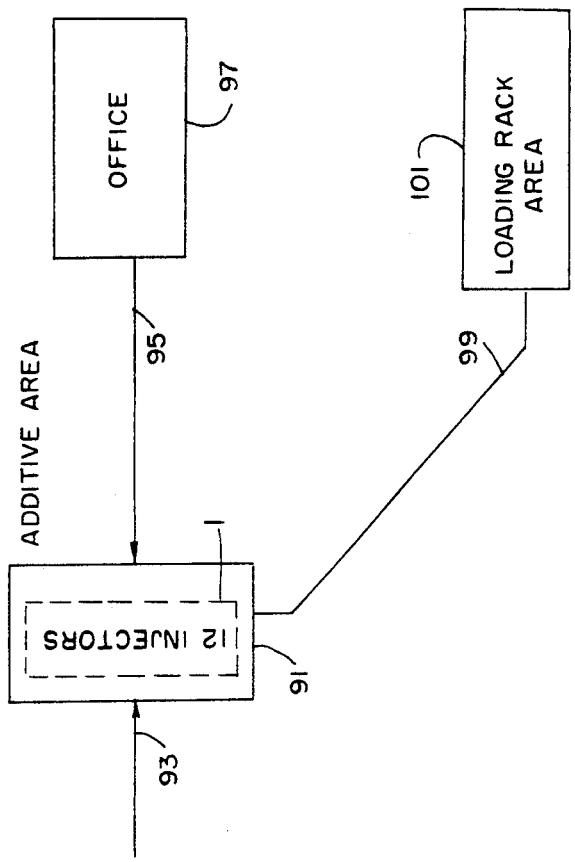
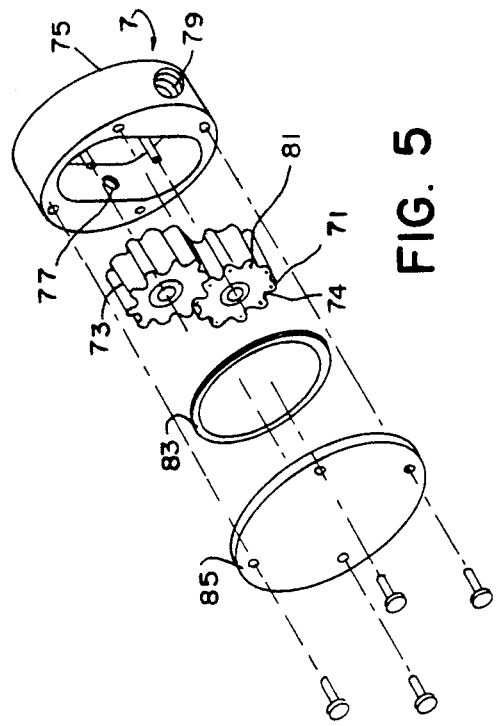
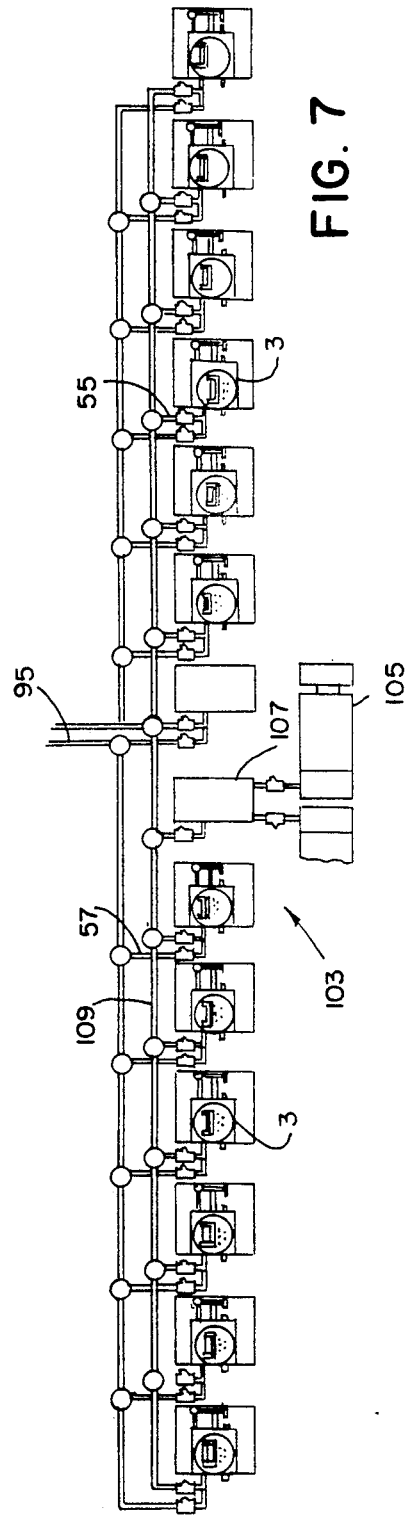

PROGRAMMABLE ADDITIVE CONTROLLER

This application is a continuation-in-part of application Ser. No. 629,651 filed Dec. 7, 1990 now U.S. Pat. No. 5,118,008.

BACKGROUND OF THE INVENTION

The invention relates to additive controllers for supplying or injecting a fluid, usually liquid additives, to large volumes of fluids, also usually liquids. One example is in supplying additive to gasoline.

Prior art additive control and injection devices use positive displacement piston-type pumps to input additives in flow streams.

Problems exist in the positive displacement-type additive devices, in that flows may vary according to velocity, pump pressures and repetition frequencies. Positive displacement-type additive supply systems require reciprocation and other motion in which parts may wear, causing periodic system shutdown for rebuilding and replacement. This is especially true in systems which use high speed reciprocations for positive displacement.

Other problems are addressed by the present invention. One example of a problem with the prior art relates to fluids in gasoline transport lines and tank farm terminals. Each oil company has particular additives to be supplied to gasoline stocks in particular ratios. The additives are added at tank farm terminals by injection into gasoline flowing from pipes into gasoline flowing into tank trucks for regional delivery. Conventional piston-type injectors have been used. Piston-type injectors are difficult to adjust; maintenance related to the positive displacement reciprocations may adversely affect tank farm operation. Injection rates which vary according to viscosity, pump pressure and frequency may create inaccuracies in formulations. Injection rate errors may be cumulative. Broken or breached pistons may increase additive flows in unexpected amounts over long periods without knowledge.

The present invention is directed to solving those problems and other problems of the prior art.

SUMMARY OF THE INVENTION

The present invention solves problems of long-standing in the prior art by providing programmable additive controllers with few movable parts. The controllers do not depend on conventional piston-type injectors. The programmable additive controllers of the present invention have wide use in the chemical industry. The basic controller includes an inlet and an adjacent filter, a shut-off valve, a flowmeter downstream from the filter and a control valve downstream from the meter. The control, or solenoid, valve controls flow of fluid additives in the controller apparatus and is preferably activated by a solenoid. The flowmeter is connected by an intermediate additive supply line to the control valve and is used for measuring a volume of fluid flowing through the apparatus. A three-way valve connects to the control valve for selectively flowing fluid additive either to a test collector or to an outlet for ejection into a mixing tank or pipe. A controller for opening and closing the control valve has a settable means for controlling cyclic operation of the control valve. The controller opens the control valve upon a command. The controller further incorporates an input for setting quantities of additive to be added on each cycle. A comparator in the controller compares a predetermined quantity with a signal output which indicates flow through the flowmeter. The comparator compares the flowmeter output to the preset cyclic input quantity and closes the control valve and prevents further flow of additive when the cumulative flowmeter output approaches the predetermined cyclic input. As the control valve is downstream from the meter, the flowmeter stops when the control valve is fully closed, leaving additive in the meter and supply line. That amount of additive is injected in the next cycle, providing an accurate measurement of metered product. The flowmeter sends pulses as the signal output to the comparator. The pulses can be detected through the use of a Hall Effect sensor or other sensing device, which detects the passing of magnets in the lobes of the meter.

The present programmable additive controller unit is a state-of-the-art, third generation microprocessor-based chemical additive injector panel suitable for a variety of chemical additive injection applications.

The system of the present invention provides additive totalizing, programmable preset and RS-422 data communications. The system provides automatic batch averaging, alarm display, security lockout and programmable meter factor. The present invention provides a controller which uses a state-of-the-art flowmeter. The controller has an EEPROM memory with a 10-year storage of data. The system is capable of operation from 130° F. to −40° F. with a heater. A thermostat turns on at 40° F. and off and 55° F.

In one preferred embodiment, the system has ¼" inlet and outlet and test connections. The system uses 130 watts of 120 volt 60 cycle current. A solenoid control valve uses 22 watts, and an enclosure heater uses 100 watts.

The system is constructed of high tech materials, 300 series stainless steel, Ryton, Kalrez and Teflon.

The system operating pressure is 250 lbs. per square inch maximum, and the differential pressure is 100 lbs. per square inch maximum. A preferred embodiment provides a minimum injection per cycle of about 5 or fewer cc's, and a maximum of about 900 or more cc's per cycle.

The present system outperforms all conventional piston-type injector panels, regardless of viscosity, pump pressure or pulse frequency.

In one example of operation with hydraulic oil as a test medium, the system has a pressure drop of 25 lbs. per square inch and a meter pulse of 40:1. A typical additive injection pulse has a half-second duration. In the example of the product load rate of 600 gallons per minute and 15 cycles per minute, the system delivered 685 cc's per cycle, or 2.71 gallons per minute. Additive pump pressure was 125 lbs. per square inch, and line pressure was 40 lbs. per square inch. A preferred program additive controller system has dimensions of about 21×17×9 inches, and weighs about 33 lbs. The flowmeter has an accuracy of 0.05% of rate. In one embodiment, count input at standard high impedance, 3-30 VDC is about 10 kHz maximum. At low speed, the count may be 0-40 Hz, and at high speed 40 Hz to about 10 kHz.

Multiple panels may be used at spacings of about 4". A 120 volt secondary alarm system is provided.

The present system includes an additive totalizer, a programmable preset, a programmable meter factor and an automatic batch averaging. A highly readable, 6-digit LED display is provided, with six controls. The system is provided with electrical quick disconnects, and an alarm display. An external one-shot calibration switch is provided. The system is configured for an RS-422 serial communications. A 5-digit security lockout code is provided. Solid state electronics and power surge protection are provided. The system provides high injection rates, which are difficult to achieve with other systems.

A state-of-the-art microprocessor and flowmeter are at the heart of the system. The microprocessor gathers, monitors, analyzes, controls and displays input data to precisely control and account for chemical additive injection. The additive controller combines the versatility and speed of a microprocessor with the accuracy and reliability of a highly accurate positive displacement flowmeter.

An RS-422 serial communications port provides enhanced terminal automation integration by allowing each programmable additive controller to communicate system information to such terminal automation equipment as a load computer, a programmable logic controller or a remote host computer. The system integration from the communications port may be as simple as printing total additive loaded on a load ticket, or as complex as providing remote monitoring and control of individual injectors by a host computer. Product pulsing for additive controlling also allows total product reporting so that electronic product and additive records may be complete from the single source.

The additive controller of the present invention is externally paced, as is conventional in piston-type injectors. Pulses can be 120 volt AC or 5–30 VDC and are provided from an electrical pulse transmitter driven by a load meter. Alternatively, a DC pulse input from a pulse transmitter, as a product load transmitter, load computer or Programmable Logic Controller (PLC), can be provided. Timers and pulse generators may also be used to provide the required pulse. To the major state-of-the-art, high tech elements of the microprocessor and the positive displacement flowmeter is added a solenoid control valve. While the solid state microprocessor monitors, communicates and controls functions of the injector, the solenoid control valve actually controls the flow of the additive. A preferred control valve is a two-way, 120 volt AC normally closed, direct acting stainless steel, explosion-proof solenoid valve. The valve is used as a control valve to control all additive flow. Control of the solenoid valve is provided by the meter and the microprocessor.

The positive displacement, gear-type flowmeter, such as described in U.S. Pat. Nos. 4,641,522 and 4,815,318, is highly reliable, easy to service and accurate within 0.05% of rate. The unit accurately accounts for all additive dispensed, and communicates its pulse count to the microprocessor via a low voltage, Hall effect sensor or other appropriate sensor.

Three counters are incorporated in the controller. The first or A counter is used to count up to the preset A value (additive volume in cc's per injection). The second or B counter is used to totalize the grand total of additive injected (running total). The third or C counter is used to totalize the grand total of product treated (running total). That is significant because both totals in the Titan Industries COMM-LINK I communications software can perform a statistical process control (SPC) function and additive and product accountability. The VIEW button on the face of the microprocessor provides access to view all three counter values. The C counter counts and displays pulse inputs or counts coming from the product load meter (typically a 40:1 pulse so that each 40 gal. of gasoline equals 1 pulse generation or injection command). However, often 1:1 pulses are provided which are counted by counter C. The COMM-LINK I software does the mathematics to convert the pulse count into gallons of product.

With the present invention, primary alarms are now alarm specific as to existing alarm conditions. Previously, any time a primary alarm was activated, the word "Help" would LED display in alarm. The user would not know which alarm condition was activating the alarm. Now, the specific primary alarm condition will display in the LED light display.

In a preferred embodiment, a permissive output is available indicating the controller or injector is powered. The permissive output, when integrated with the electronic preset or other smart device, acts as a fail-safe, thereby allowing product loading only if the output is energized (indicating the unit is powered).

Preferably the injector is capable of operating with a DC pulse input from a pulse transmitter, as the product load meter transmitter, load computer or PLC; or the injector can alternatively use 120 VAC pulse input.

A Product Pulse Active Light is preferably installed in the face plate. This light (120 VAC or DC, depending on product transmitter output to the injector) pulses each time a pulse is received from the product transmitter (i.e. load meter pulser). Therefore, a user can easily determine the receipt of valid product pulses to the injector.

DC/Comm. Test and an AC Test connectors are also preferably provided on the face plate. That allows the user to plug into the low voltage DC and RS-422 communications functions or plug into the 120 VAC functions for ascertaining performance and trouble shooting the injector.

Preferably the injector has a 120 VAc permissive output fail-safe feature, which the customer may use to determine if the injector is powered. That output can be connected to a customer operated PLC, electronic preset, load computer, or other intelligent device, used to monitor components of a control system. If the intelligent device determines there is no power on the injector, it may take action to prevent loading or sound an alarm.

The preset design makes access to the Hall-Effect sensor much easier. The flowmeter screws directly into the explosion-proof enclosure housing the microprocessor. The Hall-Effect sensor screws into the flowmeter from inside the explosion-proof enclosure. That also makes it easier to change the solenoid control valve, if necessary.

Preferably the flowmeter 12 VDC output (additive pulse output) is now available to send to an external intelligent device as the electronic preset, load computer or other smart device. That enables the intelligent device to record and monitor additive flow and to terminate product loading in the event the additive flow is not in prescribed limits.

The batch averaging feature, as described, is a significant point. This feature is unique and provides the highest accuracy of injection. When a count more or less than the preset A count is actually received in counter A, the preset A is internally and automatically adjusted up or down by that same deviation of the measured count from the preset A count. For example, if the preset A is programmed for 100, representing 100 cc's of additive for each control pulse from the load meter related to 40 gallons of gasoline measured by a load meter; if following the first injection the counter A reaches 102 cc's, the microprocessor software scales the Preset A value to 98 cc's for the next injection only. The unit continually scales the Preset A value, if required, by the amount of deviation between the scaled volume and the actual volume injected, as indicated on counter A. As a result, when 4,000 gallons of gasoline have been measured, 10,000 cc's of additive have been injected uniformly throughout the product deliveries.

These and further and other objects and features of the invention are apparent in the disclosure, which includes the above and ongoing written specification, with the claims and the drawings.

BRIEF DESCRIPTION OF THE DRAWINGS

FIG. 5 is an exploded view of the flowmeter used with the present additive system.

FIG. 6 is a schematic representation of the use of the present invention.

FIG. 7 is a schematic representation of an installation of the present invention.

DETAILED DESCRIPTION OF THE DRAWINGS

Figure 1:
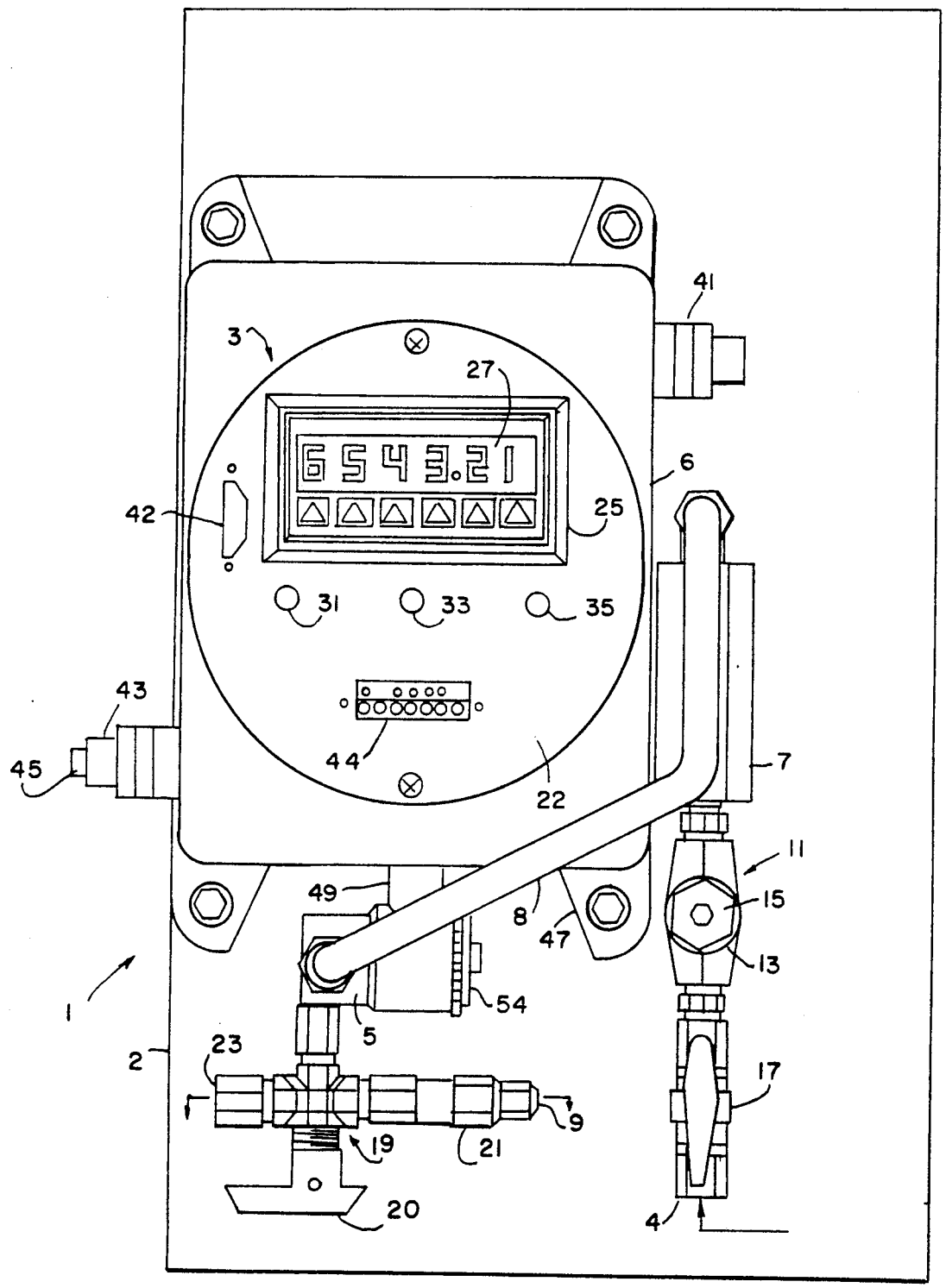
FIG. 1 is a front elevation of a panel of the invention.

Referring to FIG. 1, a programmable additive controller of the present invention is generally indicated by the numeral 1. The system includes a mounting panel 2 and a controller or microprocessor 3, an inlet 4, a control or solenoid valve 5, a flowmeter 7 and an outlet 9.

The solenoid valve 5 is proximal the outlet 9 for prompt metering and enhanced control. In a preferred embodiment, a solenoid 54 drives the valve 5.

A filter 11 with a filter receiver 13 and a filter-holding cap 15 is connected to the additive inlet 4. An on-off, two-way ball valve 17 is provided at the inlet 4. Flowmeter 7 is connected or screwed to an explosion-proof enclosure 6, and a three-way ball valve 19 is connected to the outlet of the flowmeter. The ball valve 19 has a control handle 20, which directs the output of the flowmeter through a check valve 21 to the outlet 9, which is connected to the main fluid flow. A test outlet 23 is opened with the control handle 20 as the outlet to check valve 21 is closed so that the output of the flowmeter may be collected and measured, such as in a beaker.

Additive enters the inlet 4 and passes through filter 11 before being metered in meter 7 screwed to the enclosure 6. An additive supply line 8 between the meter 7 and the solenoid valve 5 then carries the additive to the solenoid valve. Previous additive injectors placed the solenoid valve before the meter in the flow series, causing a shock to the meter and less accurate metering when the solenoid was activated. Pressure buildup in the valve hit the inactive meter due to fluid slack between the solenoid and the meter. The present invention provides the shut-off solenoid valve downstream from the flowmeter. Thus, fluid is always present in the meter 7 and supply line 8, and activating the solenoid downstream averts the prior problems. A given amount of metered fluid in the supply line 8 is left in the line after shut-off and is not injected. However, the prior and next cycle leave the exact amount in the meter and line, providing an accurate measurement of fluid injected for the present cycle.

Processor 3 has a face plate 22 with a display panel 25 incorporating a digital display 27 and push buttons 29 to control the processor and the display. Lamp 31 indicates when the solenoid is energized to open the control valve 5. Flowmeter operation is shown by the flashing of lamp 33. Lamp 35 indicates product pulse. Each time a pulse is received from a product transmitter, the lamp 35 flashes and the user knows the receipt of valid product pulsed from the injector. A fuse is provided and mounted on the circuit board inside the enclose 6 behind the face plate 22. An off/auto switch 41 is mounted on the right side of the microprocessor. A calibration push button 43 and an alarm light 45 are mounted on the left side of the microprocessor 3. Feet 47 are used to mount the enclosure on the panel 2. An electrical connection 49 connects the microprocessor to the solenoid control valve 5. A sensor (not shown) such as a Hall effect sensor, senses operation of the flowmeter 7 and communicates that operation to the microprocessor. The sensor screws into the flowmeter from inside of the explosion-proof enclosure.

DC/Comm Test connector 42 and AC Test connector 44 are provided on a face plate 22. That allows the user to plug into low voltage DC and RS-422 communications functions, or plug into the 120 VAC functions for ascertaining performance and trouble shooting the injector.

Figure 2:
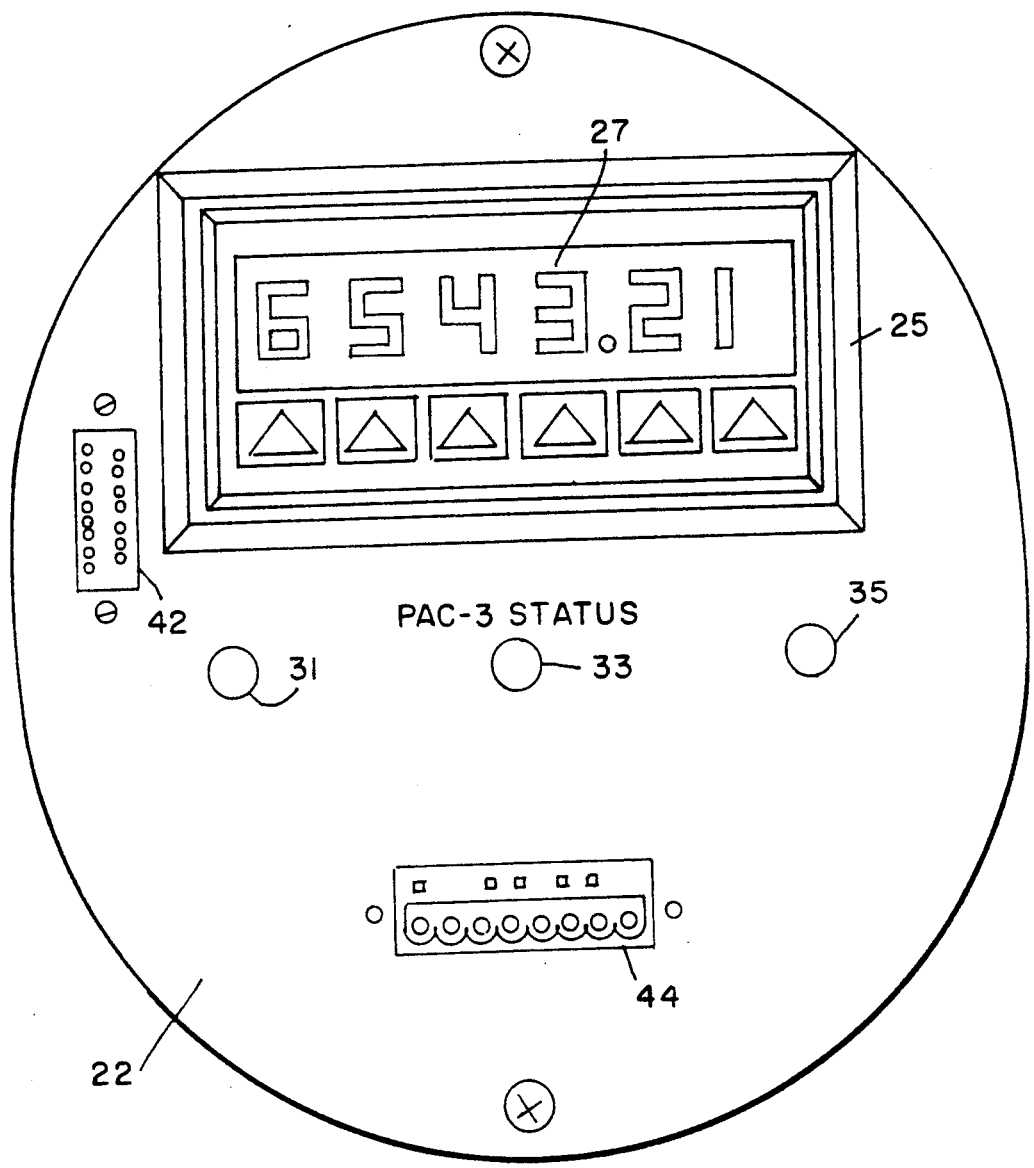
FIG. 2 is a view of the face plate.

FIG. 2 shows the face plate 22, the display panel 25, the connectors 42, 44, and lamps 31, 33 and 35.

Figure 3:
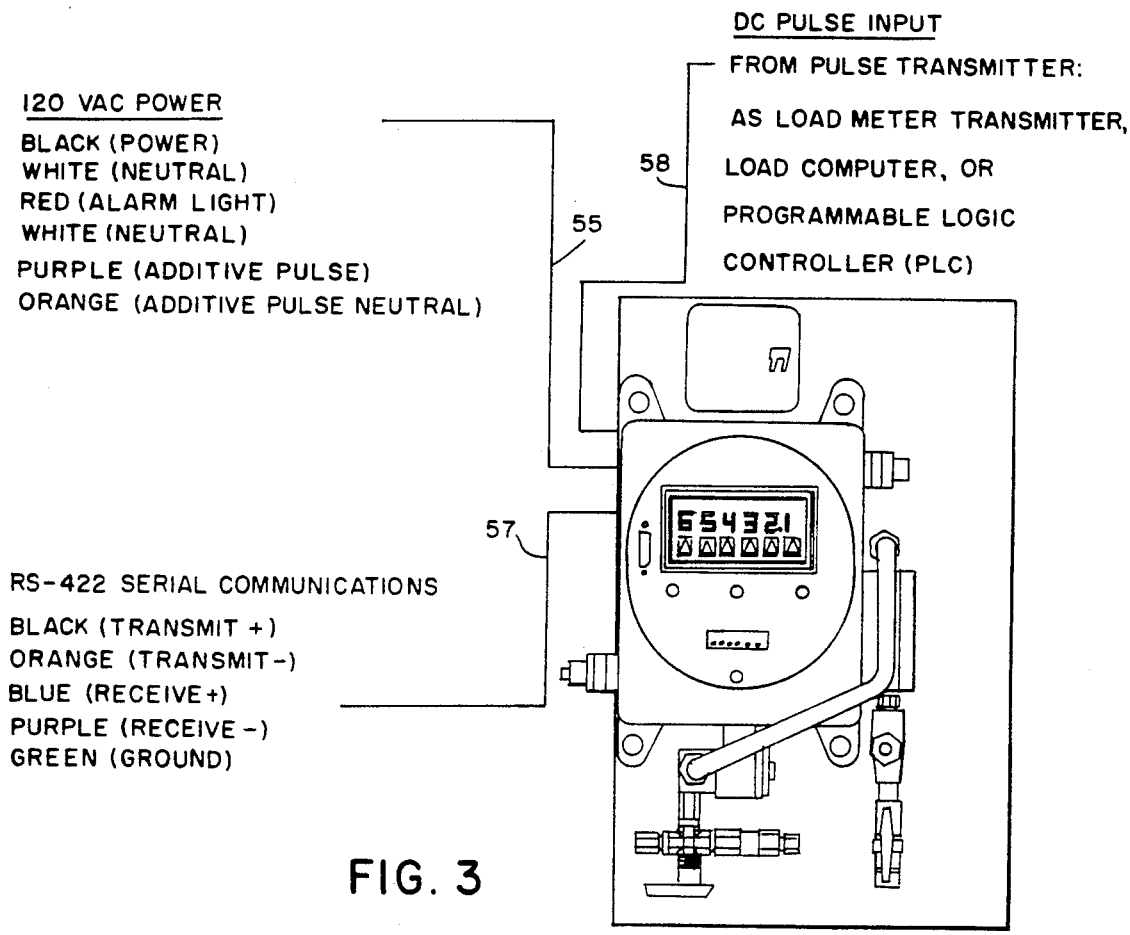
FIG. 3 is a detail showing electrical connections to the unit's circuit board.

Referring to FIG. 3, in one embodiment a 120 volt AC power connection 55 provides a two-wire power and neutral connector, a two-wire alarm connector and a two-wire pulse connector. A DC pulse input capability 58 is provided from a pulse transmitter, as a product load meter transmitter, load computer or PLC. Serial communications to the microprocessor 3 as shown schematically at 57 have two paired transmit wires, two paired receive wires, and a ground.

Figure 4:
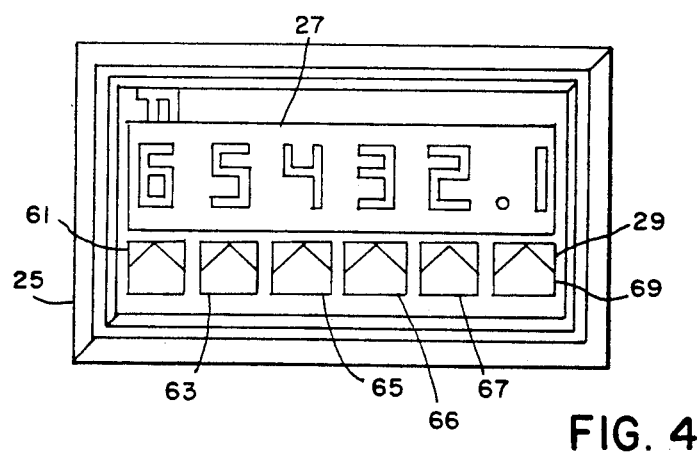
FIG. 4 shows a display of the microprocessor.

As shown in FIG. 4, the display panel 25 has a 6-digit, illuminated display 27. Push buttons 29 control functions of the microprocessor. Button 61 is pressed to reset the computer or to enter data. Lock button 63 is pressed to enter a lock code. Button 65 is pressed to view the preset cyclic additive quantity or to change that quantity. Button 66 is pressed to enter a product pulse divide, if required. If the unit is receiving a 40:1 pulse, no divide is necessary. If a 1:1 pulse is being received, the user would enter 40, which would allow the injector to inject on a 40:1. Button 67 is pressed to review totals of additive and main product, and button 69 is pressed to cycle between program choices.

All input data to the microprocessor 3 is easily programmed by the user and system data is LED displayed in direct engineering units (i.e. cubic centimeters or gallons).

The microprocessor contains three counters. Counter A is used as the additive batch counter and is programmed to display its count in cc's per pulse activation. Counter B is programmed to display additive grand total and is programmed to display its count in gallons and tenths of gallons. By changing the location of the decimal point in the B counter, the microprocessor will display the additive grand total in hundredths. Counter C counts activating pulses which are related to product flow. The display displays product in gallons.

Activation of the microprocessor 3 is accomplished by the receipt of an externally paced 120 VAC pulses (injection command) from the load meter transmitter or pulsing device. Alternatively, the injector is capable of operating with a DC pulse input from a pulse transmitter, as the product load meter transmitter, load computer or PLC. Previous units could only inject with a 120 VAC pulse input to the injector. On receipt of a pulse, the microprocessor energizes the solenoid control valve 5, opening the valve and allowing pressurized flow of additive through the flowmeter. The flow of additive through the flowmeter 7 results in the generation of low voltage pulses from the flowmeter to the microprocessor, as detected by a sensor such as the Hall Effect sensor. Based on the flowmeter configuration and user programming, each pulse represents a quantity of additive. The pulse train represents total flow of additive. Product Pulse Active Light has been installed in the face plate and replaces the previous "Injection" light. That light (120 VAC or DC depending on product transmitter output to the injector) pulses each time a pulse is received from the product transmitter (i.e. load meter pulser). Therefore, a user can easily determine the receipt of valid product pulses to the injector. When the volume injected equals the programmed value for a preset batch count in counter A, the microprocessor de-energizes the solenoid control valve, thereby ending the injection cycle. The unit remains in a standby mode awaiting the next load meter pulse injection command to repeat the process, with additive still remaining in the meter and supply line above the solenoid.

The injector has a 120 VAC permissive output fail-safe feature, which the customer may use to determine the injector is powered. That output can be connected to a customer operated PLC, electronic preset, load computer, or other intelligent device used to monitor components of a control system. If the intelligent device determines there is no power on the injector, it may take action to prevent loading or sound an alarm.

DC/Comm. Test and an AC Test connectors have been added to the face plate. That allows the user to plug into the low voltage DC and RS-422 communications functions and plug into the 120 VAC functions for ascertaining performance and trouble shooting the injector.

During normal operations, the microprocessor counter A will count up from zero to the programmed preset value in Preset A upon each pulse activation. The unit displays the actual injection volume in cubic centimeters for each pulse activation. Additionally, counter C increments upon each pulse activation and counter B computes a new additive grand total. By pressing key 69, the user may view the product total, the additive grand total or the batch count. The process is repeated throughout the tank or tank truck loading, until the load meter pulse and load permissive is terminated.

The present microprocessor incorporates a unique batch averaging feature which automatically scales the Preset A programmed value following each injection sequence, to compensate for changing hydraulic conditions. This feature insures the system will inject the exact programmed batch count (cubic centimeters per meter pulse), regardless of changing hydraulic conditions (i.e. additive pump pressure, pressure drop, viscosity).

The inlet supply pressure at inlet 4 should be at least about 20 psi above the total differential pressure expected. The capacity of the additive supply pump should exceed the total demand of all of the injectors which can operate simultaneously. Preferably the additive supply pump is twice the size necessary for the expected flow.

A stainless steel filter in receiver 13 is removable to remove any contamination from the additive line.

With the power applied to the microprocessor and the switch 41 in the auto position, the display shows product grand total, additive grand total or batch count. The pulse lamp 35 lights to indicate a pulse delivered from the product transmitter.

Switch 69 is pressed to change the display between batch count of a single injection cycle and additive grant total. On activation by a load pulse, the solenoid indicator light 31 turns on, indicating the solenoid has energized and that control valve 5 is open. The display increments rapidly to the preset batch count.

The flowmeter lamp 33 pulses, indicating low voltage pulses from the flowmeter. Illumination of lamp 33 simultaneously indicates flow through the flowmeter. The flowmeter lamp pulses are caused by pulses from the flowmeter.

On completion of the injection to the preset value, the control de-energizes the solenoid control valve 5 and the solenoid lamp 31 turns off. That halts flow of the additive downstream from the flowmeter, halting the metering of additive injected. However, lamp 33 may remain on if the flowmeter stops in an active pulse sensing position.

The injector incorporates five alarms. Four alarms are incorporated into the microprocessor software and one alarm (secondary alarm) is incorporated into the circuit board servicing the injector. When the injector enters any one of the five alarm states herein, a 120 VAC alarm output is provided for customer use. The user may use the output to terminate loading or notify personnel of an alarm condition via an alarm light or horn. When any one of the four alarms incorporated in the microprocessor is activated, the specific alarm is LED displayed. If any of the five alarms herein are activated, all alarms may be reset by cycling the power. The four microprocessor alarms may be reset by initiating the software command for reset, via the RS-422 serial communications. The following four microprocessor controlled alarms are defined.

Primary alarms are alarm specific as to existing alarm conditions. Previously, any time a primary alarm was activated, the word "HELP" would LED display in alarm. The user would not know which alarm condition was activating the alarm. Now, the specific primary alarm condition will display in the LED light alarm. There are four primary alarms, two of which are low alarm conditions and two are high alarm conditions. The four alarms are:

Low Alarms:

(a) Alarm Lo

Under the program menu, the user may elect to arm or disarm the Alarm Lo. Provided the user selects to arm the alarm, the alarm is used to indicate a severe under injection of additive. The injector will alarm following three consecutive injection attempts, in which the programmed Preset A value was not reached and the "delay" time-out was activated. On activation of the Alarm Lo, the alarm output is energized, the LED display will indicate the alarm condition by alternating, at two second intervals, between the Alarm Lo display and the selected VIEW data display (typically Additive Grand Total). When the injector is in this alarmed state, it does not prevent further injection attempts.

(b) Pulse Dropped

If the user elects to not activate the Alarm Lo feature above, the Pulse Dropped Alarm will not be activated either. Provided the user selects to arm the Alarm Lo, the Pulse Dropped alarm serves to insure all product pulses are accounted for, including pulses received during the injection cycle while the solenoid is energized. Previously, these dropped pulses were not accounted for and were disregarded. The Pulse Dropped Alarm will activate following the receipt of three consecutive product pulses, which occur while the injector is attempting to complete the previous injection request. On activation of the Pulse dropped Alarm, the alarm output is energized, the LED display will indicate the alarm condition by alternating, at two second intervals, between the Pulse Dropped Alarm display and the selected VIEW data display (typically Additive Grand Total). When the injector is in this alarmed state, it does not prevent further injection attempts.

High Alarms:

(c) Pulse Detection

The Pulse Detection Alarm is designed to activate in the event the microprocessor does not count or detect pulses from the flowmeter within 0.5 seconds of the receipt of a valid injection request. The inability of the microprocessor to recognize flowmeter pulses could cause a severe over injection of additive. The Pulse Detection Alarm activates only following three consecutive injection requests, in which the microprocessor does not detect flowmeter pulses within the prescribed 0.5 second time period. On activation of the Pulse Detection Alarm, the alarm output is energized, the LED display will indicate the alarm condition by alternating, at two second intervals, between the Pulse Detection Alarm display and the selected VIEW data display (typically Additive Grand Total). When the injector is in this alarmed state, further injection attempts are prohibited.

(d) Alarm Hi

The Alarm High alarm is designed to prevent a gross over injection of additive. The Alarm High alarm activates if the batch count (count up from zero to the programmed Preset A value) ever exceeds a given number of times over the programmed Preset A value. A preferred number of times over the Preset A value is ten.

The secondary alarm is the fifth alarm and continues to operate as before. It is also a high alarm.

The secondary alarm functions as a fail-safe alarm, in the event of a failure of the microprocessor software in preventing a gross over injection of additive. The relay controlling the secondary alarm is mounted on the circuit board inside the enclosure and monitors the energized state of the solenoid control valve. If the relay detects the solenoid has been energized for 20 seconds continuous, the relay terminates power to the solenoid and prevents further injection attempts. Activation of the Secondary Alarm will cause the 120 VAC alarm output to energize. The alarm output provides the means for the injector to effectively alert terminal personnel that there has been an injector failure (i.e. sound a horn, illuminate a warning light or terminate loading at the appropriate loadspot). The Secondary Alarm can not be accessed via the RS-422 serial communications, and can only be reset by cycling the OFF-AUTO switch.

All five alarms have a 120 VAC output available for customer use to terminate loading or light an alarm light or energize a horn.

Testing and calibration of the injector is performed without opening the explosion-proof enclosure which surrounds the microprocessor 3.

The serial communications link 57 allows counting and control of the additive controller 1 remotely. All information programmed and displayed on the microprocessor 3 and the alarm conditions may be communicated via a modem link to a remote host computer, or the information may be communicated directly to a local host computer via a direct link via shielded cable.

The off/auto switch provides external power control of the injector external to the explosion-proof enclosure 6.

The flowmeter 7, as shown in FIG. 5, has two rotating impellers 71 and 73 with lobes 74, which rotate within a case 75. Fluid moves through inlet 77 to outlet 79. Each pocket formed between the lobes and the case forms a known volume. Magnet(s) are embedded in each of the lobes on one gear only. As the magnets pass the Hall effect sensor 51 within the explosion-proof casing, a 12 volt pulse is generated and transmitted to the microprocessor 3. Each pulse represents a known volume of additive, and the volumetric flow rate is determined by counting the pulses. The flowmeter is sealed by an O-ring 83, and is closed by a cover 85.

As shown in FIG. 6, twelve injectors 1 are mounted in an additive area 91. A power supply 93 is provided to the injectors. A telephone line 95 connects the injector area to a remote office 97, and pulse and pump request circuits 99 connect the additive area 91 to a loading rack area 101. As shown in FIG. 7, the injector area has two additive pumps 103 and 105, which are supplied with power through a motor starter 107. A telephone cable supplies communications to the individual communication lines 57 connected to the microprocessors 3.

Figure 8:
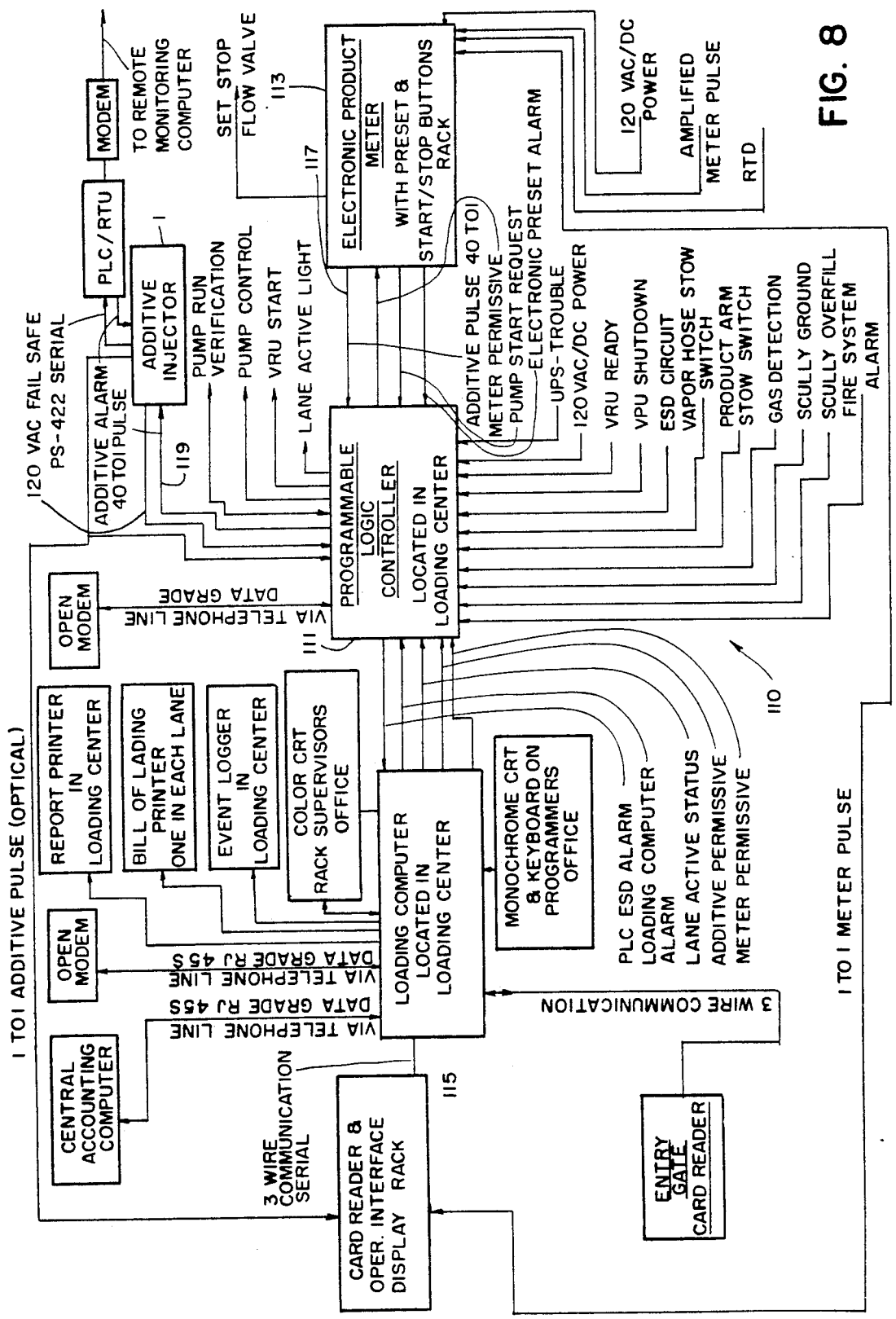
FIG. 8 is a block diagram of the operating system.

In FIG. 8, a typical operating system 110 comprises a programmable logic controller 110, which is connected to an electronic product meter 113 and a loading computer 115. Each additive injector 1 is connected to the main controller 111. The injector 1 receives pulses 119, either DC or 120 VAC, in a ratio of 40 gallons of product for pulse.

The electronic product meter 113 supplies pulses 117 to the controller 111, and the controller 111 supplies pulses 119 to each additive injector 1. The additive injector then supplies the predetermined ratio of additive to the product being measured by the electronic product meter.

The other connections as shown and described in FIG. 8 are typical connections in an operating system for a loading rack configuration with additive remote monitoring.

While the invention has been described with reference to specific embodiments, modifications and variations of the invention may be constructed without departing from the scope of the invention, which is defined in the following claims.

I claim:

1. Programmable additive controller apparatus for the chemical industry, comprising an inlet, a filter connected to the inlet, an additive flowmeter connected to the filter for metering additive entering the apparatus, a control valve connected downstream from the flowmeter for controlling the flow of additive from the flowmeter, the flowmeter having a signal output for indicating additive volumes flowing through the flowmeter, a controller connected to the control valve for cyclically opening the control valve upon a command pulse, the controller having an input for inputting a quantity of additive to be added on each cycle and the controller having an opener for opening the control valve, a comparator having an accumulator for accumulating signal output from the flowmeter and the controller having a comparator for comparing accumulated signal output from the flowmeter and the input quantity, and having a closing control for closing the control valve and preventing further flow of additive when the accumulated flowmeter signal output approaches the input quantity, and further comprising an output connected to the flowmeter for injecting the additive into a main product flow.

2. The apparatus of claim 1, further comprising condition specific alarms connected to the controller for signalling specific malfunctions of the apparatus.

3. The apparatus of claim 2, further comprising at least one under injection alarm provided for signalling if an amount of additive injected is less than the amount inputted in the controller, and at least one over injection alarm provided for signalling if an injected amount of additive exceeds the amount inputted to the controller.

4. The apparatus of claim 3, further comprising an under injection alarm responsive to the signal output from the flowmeter indicating injection of a quantity less than the inputted quantity.

5. The apparatus of claim 3, further comprising an under injection alarm responsive to the command pulse, wherein the alarm signals if the control valve receives command pulses for future cycles while injecting in a current cycle, signifying an inability of the additive controller apparatus to maintain a desired injection quantity.

6. The apparatus of claim 3, further comprising an over injection alarm responsive to non-receipt of the signal output from the flowmeter a given time period after opening the control valve on the command pulse.

7. The apparatus of claim 3, comprising an over injection alarm responsive to a given amount of injected additive exceeding the inputted amount to the controller.

8. The apparatus of claim 7, further comprising the alarm signalling when the injected amount exceeds the inputted amount by ten times.

9. The apparatus of claim 3, further comprising the over injection alarms provided with a linkage to the control valve, wherein an over injection activates the over injection alarm which closes the control valve to prevent further injection during that cycle.

10. The apparatus of claim 2, further comprising an over injection alarm responsive to an amount of time that the control valve is open during a given cycle, wherein above a set time limit the alarm signals the controller and closes the control valve.

11. The apparatus of claim 1, further comprising the controller provided within an explosion-proof enclosure and the flowmeter screwed into the enclosure a Hall Effect sensor connected to the controller and attached within the casing for sensing the signal output of the flowmeter and conveying to the controller the signal output from the flowmeter.

12. The apparatus of claim 1, further comprising the means for comparing additive flow and target, and adjusting the target up or down according to a previous flow-target difference.

13. The apparatus of claim 1, further comprising at least one test connector connected to the controller for ascertaining performance and trouble shooting.

14. The apparatus of claim 13, further comprising a low voltage test connector provided for testing the controller when the controller is powered by direct current.

15. The apparatus of claim 13, further comprising a test connector provided for testing RS-422 communications.

16. The apparatus of claim 12, further comprising an AC test connector for testing the controller when the controller is powered by alternating current.

17. The apparatus of claim 1, further comprising a check valve connected to the output for preventing back flow through the output, a three-way valve connected between the flowmeter and the check valve and a test outlet connected to the three-way valve for selectively supplying additive from the flowmeter to the test output for physically measuring additive flowing through the flowmeter.

18. The apparatus of claim 1, wherein the controller has a digital display and a selector connected to the display for displaying preselected input quantity of additive for each cycle, flowmeter output during each cycle, and total cumulative additive.

19. The apparatus of claim 1, wherein the controller has first, second and third counters for counting additive flow during each cycle for counting total cumulative additive flow, and for counting command pulses from the product meter for indicating total product flow, respectively.

20. The apparatus of claim 1, wherein the opener for opening the control valve comprises resettable means responsive to an external starting pulse.

21. The apparatus of claim 1, wherein the controller has a pushbutton for functioning as a divider for incoming product pulses, for entering a 1 if 40:1 is already entered, and for entering a number between 00 and 99 determinative of gallons of product flow per pulse.

* * * * *